(12) United States Patent
Bar-Nahum

(10) Patent No.: US 6,496,183 B1
(45) Date of Patent: Dec. 17, 2002

(54) FILTER FOR TRANSFORMING 3D DATA IN A HARDWARE ACCELERATED RENDERING ARCHITECTURE

(75) Inventor: Guy Bar-Nahum, Palo Alto, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/107,918

(22) Filed: Jun. 30, 1998

(51) Int. Cl.$^7$ ............................................. G06T 15/00
(52) U.S. Cl. ....................................................... 345/419
(58) Field of Search ............................... 345/419, 427, 345/302, 421, 426, 619, 220, 621

(56) References Cited

U.S. PATENT DOCUMENTS

| | | | |
|---|---|---|---|
| 5,594,843 A | * | 1/1997 | O'Neill ........................ 345/427 |
| 5,867,210 A | | 2/1999 | Rod ............................ 348/51 |
| 5,929,859 A | * | 7/1999 | Meijers ...................... 345/419 |
| 5,949,420 A | * | 9/1999 | Terlutter ..................... 345/419 |

\* cited by examiner

*Primary Examiner*—Phu K. Nguyen
(74) *Attorney, Agent, or Firm*—Michael Schmitt

(57) ABSTRACT

A method and apparatus for generating multiple views for graphics objects utilizes a filter for transforming the 3D content of the data. The filter is configured to receive function calls from a 3D rendering engine and generate multiple viewpoint data based on the 3D content of the graphics object. The filter then transmits the viewpoint data to a display driver for display to a display device.

28 Claims, 8 Drawing Sheets

(W/2, H/2, -h)

(W/2-d H/2, -h)

FILTER FOR TRANSFORMING 3D DATA IN A HARDWARE ACCELERATED RENDERING ARCHITECTURE

CROSS-REFERENCE TO RELATED APPLICATIONS

This application is related to the following commonly-assigned, copending applications, Ser. No. 08/972,511 filed Nov. 18, 1997, entitled FILTER BETWEEN GRAPHICS ENGINE AND DRIVER FOR EXTRACTING INFORMATION, and Ser. No. 09/002,139 filed Dec. 31, 1997, entitled APPARATUS AND METHOD FOR DYNAMICALLY CONTROLLING BRIGHTNESS OF OBJECTS ON A DISPLAY MONITOR, both of which are incorporated herein by reference.

TECHNICAL FIELD

The present invention relates to computer systems that generate graphics and more particularly to generating 3-dimensional (3D) graphics.

BACKGROUND ART

Software application programs that utilize increased graphics have become more prevalent. For example, video games often utilize an increasing amount of 3D graphics for display on a typical personal computer (PC) monitor. These graphics applications require the computer system to include 3D rendering software to support the graphical content. FIG. 1 is a block diagram illustrating a conventional computer system for executing typical graphics application programs and displaying the graphics.

Referring to FIG. 1, computer system 10 may be implemented, for example, as a Pentium-based PC utilizing a Windows 9x or Windows NT operating system from Microsoft Corporation. Computer system 100 includes a software portion 12 and a hardware display portion 14. The software portion 12 includes an application program 16, an operating system 3D rendering engine 18 and a third party 2-dimensional (2D) display driver 20. The application 16 generates function calls to the operating system (OS) of computer system 10 to perform OS services. Specifically, the application 16 generates function calls to 3D rendering engine 18, also referred to as a graphics module, via the operating system's defined applications programmer interface (API).

The 3D rendering engine 18 performs operations associated with graphics, for example tracking the state of a scene, caching geometry and textures into their internal representations, customizing rendering engine 18 according to the application calls, etc. The 3D rendering engine 18 manipulates the 3D objects it processes using temporary buffers, such as stencil buffers and Z-buffers and one or more final result 2D buffers for a rendered frame.

After performing 3D rendering, the application 16 instructs 3D rendering engine 18 to render the scene into a resultant frame buffer via the 2D display driver 20. The 3D rendering engine communicates with the 2D display driver 20 via the operating system's API. The 3D rendering engine 18 renders the 3D scene into a final 2D image in the frame buffer, typically located in 2D display adapter 22. The 2D display adapter then converts the video data in the frame buffer to analog video (RGB) signals, and display monitor 24 displays the final image.

SUMMARY OF THE INVENTION

A drawback with the software rendering architecture illustrated in FIG. 1 is that the output from 3D rendering engine 18 is merely a 2-dimensional (2D) image in a frame buffer of the 2D display adapter 22. The 2D image is then output to monitor 24, such as a conventional PC monitor. Accordingly, the software rendering architecture is unable to generate stereoscopic 3D content.

Additionally, in other systems utilizing hardware rendering architectures, 3D acceleration devices may be used to execute some or all of the rendering requests in hardware. However, the resulting output of the 3D rendering is still merely a 2D image in the frame buffer of the 3D accelerator. Accordingly, in systems using hardware rendering architectures, the system is unable to generate stereoscopic 3D content.

There exists a need for an arrangement in a computer system that enables the generation of stereoscopic 3D images for graphic objects, e.g., for head-mounted displays.

There is also a need for an arrangement that enables stereoscopic 3D images to be generated and output using conventional hardware drivers and 3D acceleration hardware.

These and other needs are met by the present invention, where a stereoscopic filter intercepts calls from an operating system graphics module to a display driver requesting 3D rendering operations on a graphic object. The filter then generates stereoscopic image data for a left eye viewpoint and a right eye viewpoint that is then stored in a frame buffer. The output from the display driver can then be converted to analog video signals and output to a stereoscopic display device.

According to one aspect of the invention, a method is provided for generating 3D data for a graphic object. The method includes generating, in a 3D rendering module, a function call request for a 3D rendering operation for the graphic object. The method also includes receiving the function call request by a filter and generating a plurality of viewpoint data for the 3D graphic object. Another aspect of the present invention provides a computer-readable medium that includes stored sequences of instructions that are executed by a processor. The instructions cause the processor to receive a function call generated by a 3D rendering module requesting a 3D operation for a graphics object. The instructions also cause the processor to generate a plurality of viewpoint data for the graphics object.

Other objects and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference numeral designations represent like elements throughout.

DETAILED DESCRIPTION OF INVENTION

The present invention provides an apparatus and method for generating stereoscopic 3D graphics using a stereoscopic filter. The stereoscopic filter is a software module integrated in the operating system of a computer system and is configured to intercept function calls to a 3D hardware acceleration driver. The filter generates left eye and right eye viewpoint data for a graphics object and outputs the data to a display driver for storage in a frame buffer.

Figure 1:
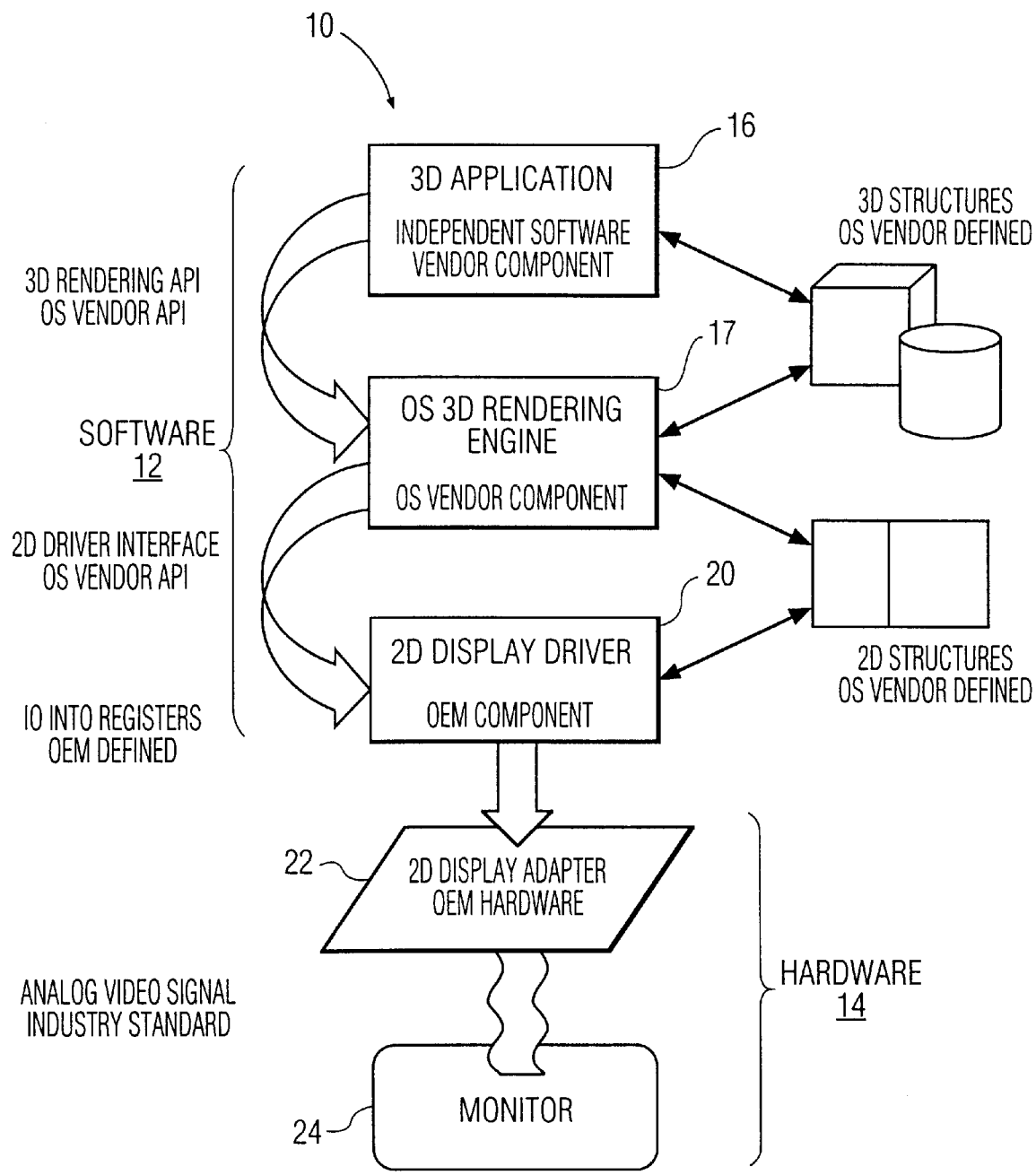
FIG. 1 is a block diagram of a conventional computer display system using software rendering.

According to an embodiment of the present invention illustrated in FIG. 2, computer system 100 includes software 40 employing an operating system that supports execution of application 16 and a hardware portion 50, described below. The operating system includes 3D rendering engine 18, described in detail above in connection with FIG. 1, for creating graphics for the software application 16.

Specifically, the application 16 generates function calls to 3D graphics rendering engine 18, also referred to as a graphics module, via the operating system's defined applications programmer interface (API).

The 3D rendering engine 18 performs operations associated with graphics and is configured in a hardware accelerated rendering mode. That is, the 3D rendering engine 18 is configured to generate function calls to a display driver. Specifically, the 3D rendering engine 18 transmits function calls, via an API, intended for 3D acceleration driver 28 requesting the performing of a graphics-related operation for a graphic object.

The stereoscopic filter 26 is a software component and is loaded by the OS of computer system 100 in a manner similar to loading a conventional display driver. The stereoscopic filter 26 appears to 3D rendering engine 18 as a conventional third party display driver configured for executing and performing the graphic operations called by the 3D rendering engine 18. As such, the stereoscopic filter 26 is transparent to the 3D rendering engine 18.

The hardware acceleration driver 28 is implemented as a separate code module that extends the 3D rendering engine 18. Accordingly, it runs in the context of the OS 3D rendering engine 18. The 3D acceleration driver 28 also exposes an interface through an array of entry points that are called as a routine call by the OS 3D rendering engine 18. The stereoscopic filter 26 utilizes this interface and uses the same entry points as the 3D acceleration driver 28.

For example, in a Microsoft Windows OS, the 3D rendering engine 18 and the 3D hardware acceleration driver 30 are implemented as a dynamic link library (DLL). As such, each executable code module has entry points of exported functions that external code can link to and call. By implementing the same required entry points in the stereoscopic filter 26, the 3D rendering engine 18 uses the stereoscopic filter 26 as if it was the conventional OEM driver.

Accordingly, the stereoscopic filter 26 intercepts the function calls intended for the 3D hardware acceleration driver 28 and performs various graphic operations, e.g., initialization, rendering and mode change activities. Although the 3D rendering engine is configured to generate function calls to 3D hardware acceleration driver 28, the actual 3D accelerator 30 is not required. The actual 3D rendering can be done in software by calling back to the 3D rendering engine 18 to emulate the requests in software. However, for illustrative purposes, the embodiment illustrated in FIG. 2 includes 3D accelerator 30.

Figure 2:
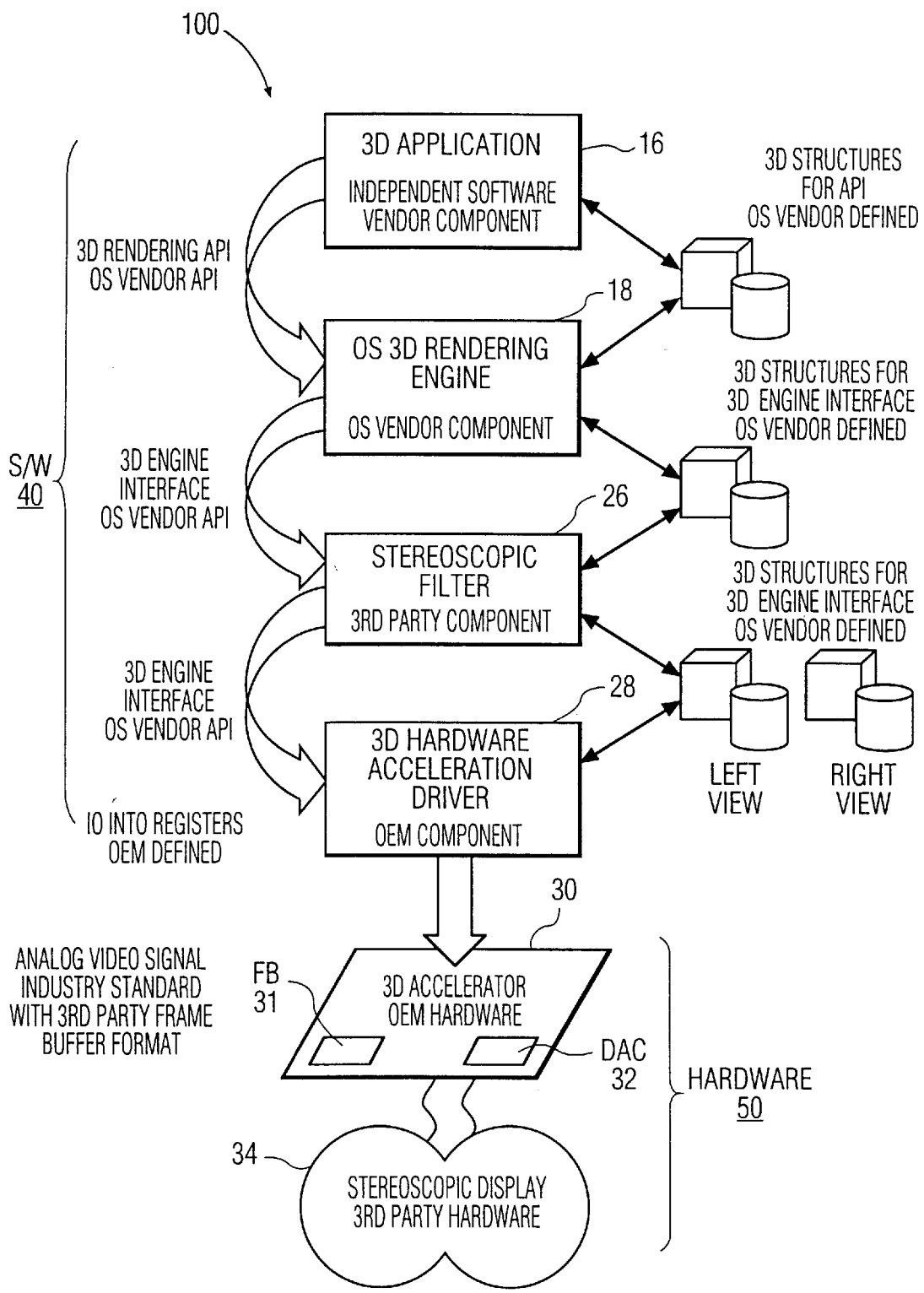
FIG. 2 is a block diagram of an exemplary computer system upon which the present invention can be implemented.

Referring to FIG. 2, the 3D hardware acceleration driver 28 controls the 3D accelerator 30. The 3D acceleration driver 28 outputs data to the 3D accelerator in the form of video data and control data. The 3D accelerator typically includes a frame buffer 31 for storing the video data and a digital-to-analog (DAC) converter 32 for converting the video data into analog RGB signals.

The stereoscopic filter 26 software operation uses three major sets of entry points:

1) Load entry points—include loading the stereoscopic filter 26 by computer system 100 and other initialization activities that would ensure the correct filtering of the requests from the 3D rendering engine 18.

2) Mode Set Entry points—enable a special stereoscopic mode to be set. This changes the management of the 2D frame buffer 31 from one viewpoint into left and right viewpoints for the stereoscopic display.

3) Run time entry points—includes the necessary conversion of a single viewpoint 3D object geometry into a left and right viewpoint in the defined stereoscopic mode.

Figure 3:
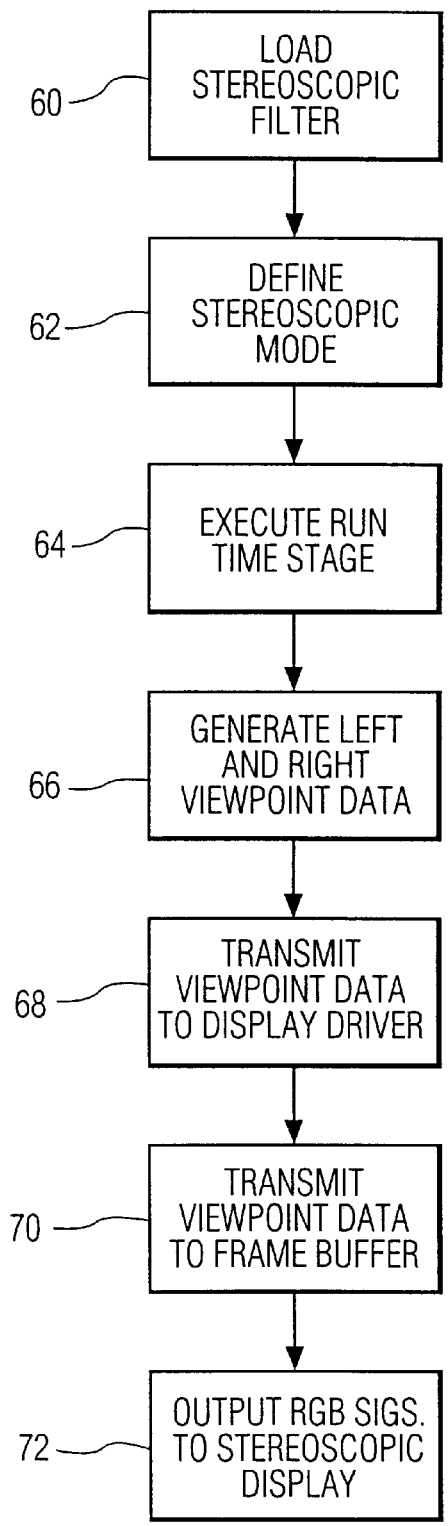
FIG. 3 is a flow diagram illustrating the operation of an exemplary computer system in accordance with an embodiment of the invention.

FIG. 3 is a flow diagram illustrating the operation of the computer system 100 of FIG. 2. At step 60, the stereoscopic filter 26 is loaded into computer system 100 in a similar manner to loading a conventional hardware acceleration driver. For example, the stereoscopic filter 26 install procedure registers the stereoscopic filter 26 in the system database as the 3D acceleration driver 28 for the system. Other miscellaneous initialization may be needed depending on the particular 3D rendering engine 18 used. For example, different 3D rendering engines 18 have different mechanisms to ensure that the engine always calls the driver, in our case the stereoscopic filter 26, for any rendering activity.

The stereoscopic filter 26 operates to ensure that the 3D rendering engine does not try to render the image into the 2D frame buffer 31 directly. There are a variety of ways in which the stereoscopic filter 26 can accomplish this. For example, the stereoscopic filter 26 can declare itself as a device managed surface driver or a fully accelerated driver to the 3D rendering engine 18. The stereoscopic filter 26 then processes the geometry function calls from the 3D rendering engine 18.

The geometry calls map the 3D objects into 2D pixels in the frame buffer 31. The stereoscopic filter 26 then passes the input 3D objects into the viewer model to generate two views and from there into reformatted 2D buffers, as discussed in more detail below.

Figure 4A:
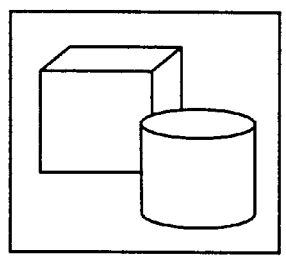
FIGS. 4A–4C illustrate various horizontal stereoscopic modes that can be used with the present invention.
Figure 4B:
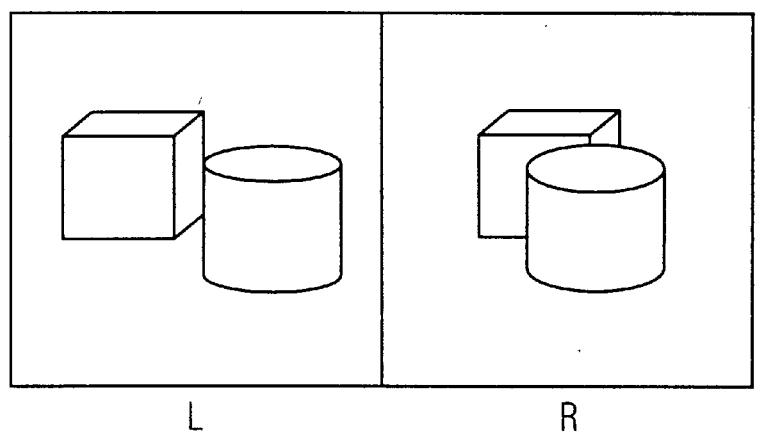
Figure 4C:
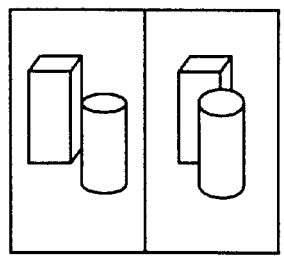

After loading the stereoscopic filter 26, the stereoscopic filter 26 defines a special stereoscopic mode in the frame buffer 31 at step 62. For a given stereoscopic mode, the left and right eye viewpoint frames are packed into the frame buffer 31. The particular mode can be a line-by-line horizontal stereoscopic mode. For example referring to FIGS. 4A–4C, FIG. 4A represents a graphic object as stored in a conventional frame buffer. FIG. 4B represents a mode in which the frame buffer is double the length of the conventional frame buffer. In this case, the physical frame buffer 31 is divided into two frames and each line in the physical frame buffer 31 is divided to contain a left line and a right line, as shown in FIG. 4B. Alternatively, if frame buffer size constraints do not allow for doubling the actual length of the frame buffer, the left and right frames can be compressed in the X-direction, as shown in FIG. 4C, to maintain the original frame buffer line length.

Figure 5A:
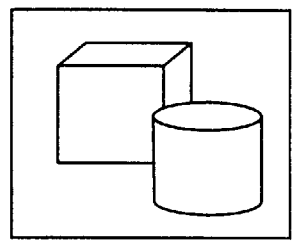
FIGS. 5A–5C illustrate various vertical stereoscopic modes that can be used with the present invention.
Figure 5B:
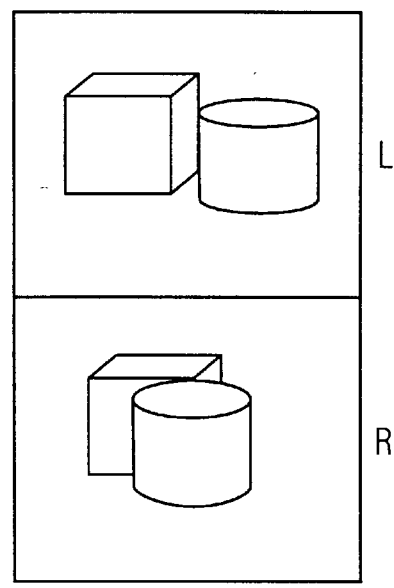
Figure 5C:
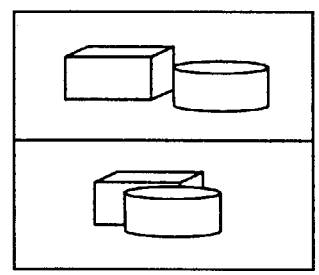

Alternatively, the stereoscopic mode can be a frame-by-frame vertical stereoscopic mode. For example referring to FIGS. 5A–5C, FIG. 5A represents a graphic object as stored in a conventional frame buffer. FIG. 5B represents a mode in which the frame buffer is double the height of the conventional frame buffer. In this case, the physical frame buffer 31 is divided into two areas. The upper half holds the left eye frame (or the right eye frame) and the lower half holds the right eye frame (or the left eye frame), as shown in FIG. 5B. Alternatively, if frame buffer 31 size constraints do not allow for doubling the actual height of the frame buffer, the left and right frames can be compressed in the Y-direction, as shown in FIG. 5C, to maintain the original frame buffer column size.

Other known stereoscopic modes that hold right and left views can also be implemented in the stereoscopic filter 26 depending on the particular stereoscopic display 34 being used. The digital-to-analog (DAC) 32, typically located on the 3D accelerator 30, scans the frame buffer 31 and generates an analog video signal that consists of the left frame followed by the right frame. The stereoscopic display 34 decodes the analog signal and extracts the separate view from the signal.

Since the frame buffer 31 configuration may be changed by the stereoscopic filter 26, more memory or different memory allocation may be needed. However, the stereoscopic filter 26 is configured to define a mode that has memory capacities that satisfy its requirements. At step 64, the stereoscopic filter 26 run time stage is executed. That is, the stereoscopic filter 26 intercepts the geometry request from the 3D rendering engine 18. In an exemplary embodiment as discussed previously, the stereoscopic filter 26 can declare itself as a device managed driver to eliminate any direct writes to the frame buffer 31, the 3D rendering engine 18 will not try to emulate directly into the frame buffer 31 and bypass the stereoscopic filter 26.

The stereoscopic filter 26 receives the rendering requests from the 3D rendering engine 18. The 3D rendering engine 18 typically delivers the rendering requests with 3D objects represented as arguments. The particular details of how the 3D data is encoded vary between different engine implementations. However, each 3D engine must define its atomic 3D geometry terminology since these are the building blocks for the 3D scene. Common 3D object representations known in the art use points in space that represent polygons, usually triangular that tile the object surface to form a 3D object.

Next at step 66, the stereoscopic filter 26 modifies the 3D object geometry requests by generating geometry values for each eye. Every 3D object in the scene is modified by a viewer model algorithm in the stereoscopic filter 26, to reflect a projection from an other point in space.

The present invention will be described in conjunction with a viewer model representation of a 3D object in relation to the final rendering viewpoints. There are many possible viewer models that can be implemented in stereoscopic filter 26. Each particular viewer model highlights different aspects of 3D depth perception and models different head and eye configurations. In the discussion below, only the inputs needed for the stereoscopic filter 26 and the outputs from it are discussed in order not to unduly obscure the invention. However, given the guidance and objectives disclosed herein, the particular details of the viewer model processing can be readily implemented based on the specific 3D rendering engine 18 being used, as well as other system constraints.

In viewer model processing, every 3D object is separated into two instances, or viewpoints, i.e., a left viewpoint and a right viewpoint. The given target projection plane of the 3D geometry is replaced with two new projection planes, one for each eye. The exact relation of the 3D location of the new planes to the original projection plane is the viewer model. The particular details of the viewer model are dependent on the OS 3D rendering engine 18 geometry representation and by the way the 3D rendering engine 18 specifies the target 2D rendering plane.

For example, in a system that renders the 3D scene into a projection of a point in space, the stereoscopic filter 26 viewer model representation replaces the rendering request from the 3D rendering engine 18 by two different rendering requests to the 3D acceleration driver 30.

Figure 6B:
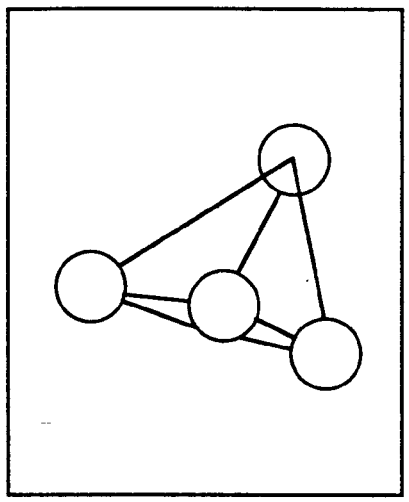
FIGS. 6A–6B illustrate viewpoint rendering.
Figure 6A:
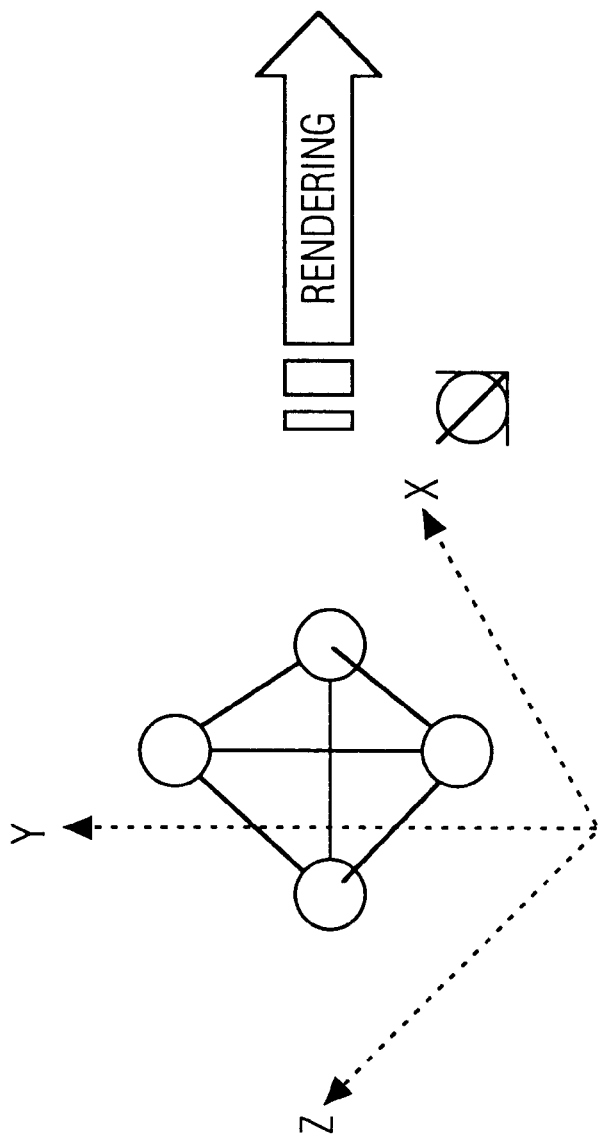
Figure 7C:
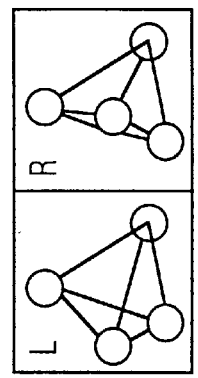
FIGS. 7A–7C illustrate viewpoint rendering in accordance with an embodiment of the present invention.
Figure 7B:
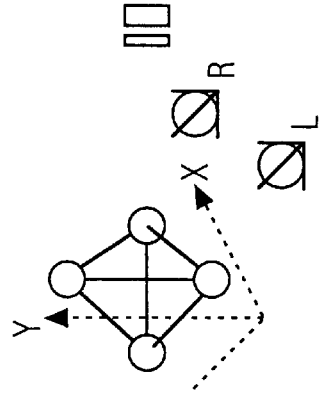
Figure 7A:
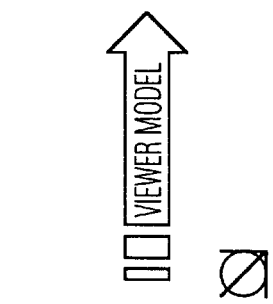
Figure 7A:
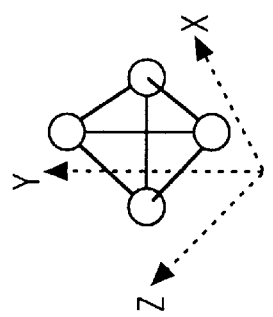

FIGS. 6A–6B illustrate 3D rendering using regular viewpoint rendering without the stereoscopic filter and FIGS. 7A–7C illustrate view point rendering using the stereoscopic filter 26. As shown in FIG. 7C, the stereoscopic filter 26 displaces the requested viewpoint to the left for the left viewpoint and assigns the result into the left frame in the frame buffer 31. The second requests handles the right viewpoint in a similar way. In the stereoscopic filter 26 viewer model, only viewpoint rendering requests generate two viewpoints, one for each eye, and the resultant eye frames are stored in the frame buffer 31.

Alternatively, in a fixed point rendering engine, the scene is always rendered into the XY plain, where geometry is in XYZ Cartesian space, and every point in the scene is relocated to represent a left viewpoint and again for the right viewpoint. The exact displacement is dependent on the location of the eyes in space.

There are other various models known in the art that can be used to generate physical viewpoints for 3D objects in space. However, for illustrative purposes, the following viewer model transform is an example that demonstrates processing steps by stereoscopic filter 26. In the example, the model is tuned for a case where the 3D rendering engine requests a rendering of the 3D objects from their XYZ representation into the XY plane.

Figure 8:
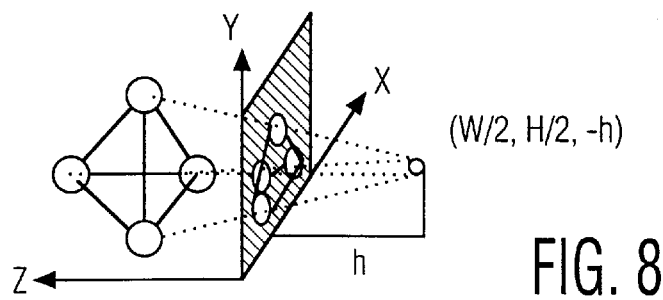
FIG. 8 illustrates a virtual focal eye point model used in a viewer model.

FIG. 8 illustrates a virtual focal eye point model representation. Given the width and height of the target 2D plane W×H, the point in space in location h, as shown in FIG. 8, is set to be far from the projection plane and in the middle of the target XY plane. This point, h, emulates the eye focal point. In order to create a separate left and right view, the focal eye point is relocated to the left and right and the stereoscopic filter 26 recalculates the XYZ location of the 3D object with respect to the relocated point.

Figure 9:
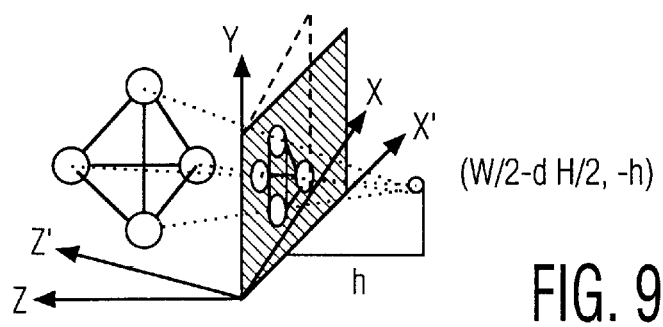
FIG. 9 illustrates a modified projection for the object in FIG. 8.

The focal point is moved in the X-axis direction by the amount of d. The left eye coordinates become (W/2−d, H/2,h) and (W/2+d, H/2,h) for the right eye. The stereoscopic filter 26 then uses the new focal point to generate a new coordinate systems X'YZ', as shown in FIG. 9, that share the Y axis with the original XYZ coordinate system, but is offset by angle $\alpha$ towards the new focal point to restore its central position W/2 on the X' axis and H/2 on the Y axis. For the new eye view, the converted 3D object is represented in the new coordinate system X'YZ' and rendered into the eye view 2D buffer. Although the above model was defined by the h and d parameters that profile the depth perception of the viewer, the stereoscopic filter 26 can parameterize the model based on the tilt angle α alone.

Figure 10:
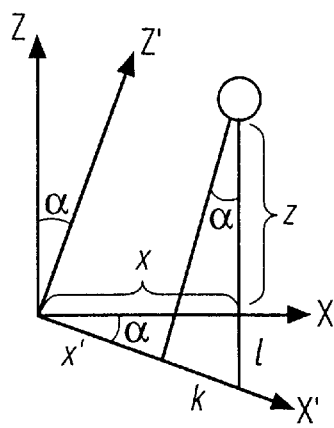
FIG. 10 illustrates a left view coordinate system for the projection in FIG. 9.

FIG. 10 illustrates a top view of the left view projection plane from FIG. 9. Because the new X'YZ' coordinate system share the Y-axis with the original coordinate system, the Y values of the 3D point stay the same. From FIG. 10, the following equations regarding α are defined:

$$\sin \alpha = k/(z+l) = l/(x'+k) \qquad \text{i)}$$

$$\cos \alpha = z'/(z+l) = x/(x'+k) \qquad \text{ii)}$$

$$\tan \alpha = l/x = k/z' \qquad \text{iii)}$$

From equation iii), l=x tan α and from equation ii) z'=(z+l) cos α=(z+x tan α)cos α=z cos α+x sin α. Further, from equation iii) k=z' tan α=z sin α+x sin α tan α and from equation ii) x'=(x−k cos α)/cos α=x/cos α−k=x(l/cos α−sin α sin α/cos α)−z sin α=x cos α−z sin α. Using the above equations, the stereoscopic filter 26 obtains the following new coordinates for the left viewpoint:

$$x' = x \cos \alpha - z \sin \alpha,$$

$$z' = z \cos \alpha + x \sin \alpha,$$

and $$y' = y \qquad \text{iv)}$$

The stereoscopic filter 26 then calculates the right view for the same point by mirroring the results from the left view. That is, the stereoscopic filter 26 mirrors the point to the left, from (x,y,z) to (W−x, y,z). Next, the stereoscopic filter 26 calculates the left value for the point, using the equation iv) transformation above. Finally, the stereoscopic filter mirrors the resultant point back to the right again, from (x',y',z') to (W−x',y',z').

After the calculation of the left and right values for the point, the stereoscopic filter 26 displaces the left and right point to their proper place in the stereoscopic mode. The transformation details depend on the exact format of the frame buffer 31 in the stereoscopic mode, which is set by the stereoscopic filter 26 as discussed previously. For example, if the same length buffer horizontal mode illustrated in FIG. 4B is used, the stereoscopic filter locates the left view in the left half of the original frame buffer and the right view in the right half. So the left point (x', y', z') would move into (x'/2, y', z'), while a right point would move into (W/2+x'/2, y', z'). Other modes would change the Y value with or without scale. Finally, the stereoscopic filter 26 passes the new geometry into the rendering stage in the 3D acceleration driver 28.

Referring back to FIG. 3, at step 68, after the left and right eye viewpoint data has been generated, the stereoscopic filter 26 redirects the 3D object to the 3D acceleration driver 28 to render the left eye object into the left frame and the right object to the right frame in the frame buffer 31. The 2D content is duplicated to appear in both left and right frame buffers.

Next at step 70, the 3D acceleration driver stores the object data into frame buffer 31 in accordance with the stereoscopic mode that was w previously set. At step 72, the DAC 32 outputs analog RGB signals to stereoscopic display 34. The particular implementation details of the stereoscopic display 34 vary depending on the device used. However, the stereoscopic display 34 is designed to create a realistic stereoscopic effect in the viewer's mind, given that the two frames are correctly displaced to match the distance between the eyes.

For example, a head mounted display that has a separate monitor for each eye may be used. In this type of display, the RGB signal is modulated to create an effect that simulated depth vision.

Alternatively, a projection system display that projects two views may also be used. In such a display, the viewer uses special glasses that block one view and let the other view pass to the eye, thereby delivering a different view to each eye. A common implementation uses a different color or polarization with color or polarization filters on the glasses.

In any event, the stereoscopic filter 26 can be used with any stereoscopic display device since the RGB video signal output from DAC 32 is generated to meet industry standards.

Figure 11:
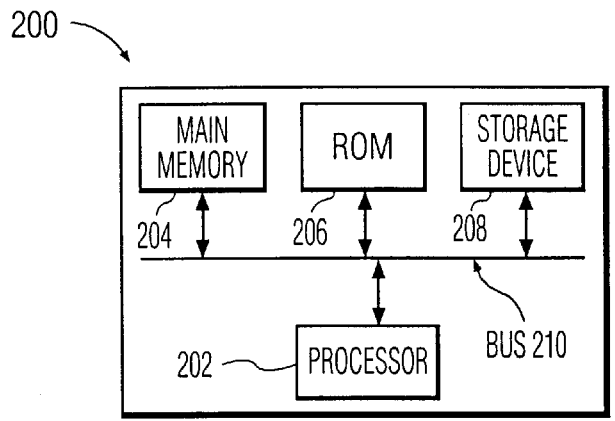
FIG. 11 is a simplified block diagram of a computer system in which the present invention can be employed.

Described above has been a method and apparatus for generating stereoscopic 3D images for graphic objects using a hardware accelerated rendering architecture. Computer system 100 of FIG. 2 may be implemented, for example, as a Pentium-based PC utilizing a Window 9x or Windows NT operating system from Microsoft Corporation. However, the stereoscopic filter is not limited to use with any particular operating system. For example, FIG. 11 is a simplified block diagram of a computer system 200 upon which an embodiment of the present invention can be implemented. Computer system 200 includes a bus 210 or other communication medium for communicating information, and a processor 202 coupled to bus 210 for processing information. Computer system 200 further comprises a random access memory (RAM) or other dynamic storage device 204 (referred to as main memory), coupled to bus 210 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 210 for storing static information and instructions for processor 202. A data storage device 208, such as a magnetic disk or optical disk and its corresponding disk drive, can be coupled to bus 210 for storing information and instructions.

Advantageously, the stereoscopic filter of the present invention can be configured to interface with any vendor 3D rendering engine, such as OpenGL or Direct3D by Microsoft Corporation. However, a specific stereoscopic filter implementation is to be used with a specific 3D rendering engine since the filter interfaces with the rendering engine's specific interface points. Further, the stereoscopic filter 26 is not limited to be used with any particular 3D acceleration driver since the communication between the filter and the acceleration driver is over the same published API.

Additionally, the stereoscopic filter can be advantageously used with any third party 3D accelerator or video adapter. The stereoscopic filter is configured to set the stereoscopic mode based on the actual device utilized. Further, the stereoscopic filter is usable with any stereoscopic display device that supports its stereoscopic mode. Another advantage of the invention is that OS software and third party components do not have to be modified to accommodate the stereoscopic filter thereby saving considerable time and costs associated with customizing various software and hardware components.

An important aspect of the invention as related to the viewer model discussed above is the ability to change the viewer's point of view to any place in the 3D space. The user then controls the stereoscopic filter in order to be able to move within the scene in a manner that is independent of the 3D content at the application level. The invention thus increases the user's sense of control. Further, this also increases the scope of interactivity with the incoming 3D content. A problem with changing the view point is that the 3D rendering engine may optimize the 3D geometry model, e.g., in terms of computations needed, by centering on a specific view point. This approach eliminates details that are not visible from this specific view point. This may include different levels of details, depending on the distance to the view point, as well as the elimination of polygons that reside in hidden-surface regions. In principle, 3D rendering engines that fully render 3D models can be manipulated by the 3D filter of the invention and change the view point independently of the application without generating artifacts.

An additional aspect of the invention is that the stereoscopic filter can be generalized to provide multiple (two or more) views based on the same 3D content, but rendered from different points of view. Basically, the calculations discussed above under formulae i)–iv) are then replaced by other appropriates ones. For example, in a multi-user software application, e.g., a video game, where different users stay together as a team in a virtual environment and face the similar object, the filter generates different views from the object based on the single 3D content and on the different points of view. The views generated for each individual user may, but need not, be stereoscopic in nature. For example, the views may be multiple monocular images.

It is noted that there are various ways to implement the data transformations carried out by the filter in the stereoscopic mode of operation. One way is to generate left eye and right eye views by carrying out the transformations discussed above, i.e., locating the new focus center and generating two different views that are mirror images of each other. Alternatively, the focus point view can be taken as the left (or right) eye view, and a version thereof horizontally translated over a distance W is taken as the right (or left) eye view.

In this disclosure, there is shown and described only certain preferred embodiments of the invention, but, as aforementioned, it is to be understood that the invention is capable of use in various other combinations and environments and is capable of changes or modifications within the scope of the inventive concept as expressed herein.

What is claimed is:

1. In a computer system, a method for generating 3D data for a graphic object comprising the steps of:
   generating, in a 3D rendering module, a function call request for a 3D rendering operation for the graphic object;
   receiving, by a filter, the function call request; and
   generating, in the filter, a plurality of viewpoint data for the 3D graphic object.

2. The method of claim 1, comprising:
   generating, in the filter, left eye viewpoint data and right eye viewpoint data for the 3D graphic object; and
   transmitting the left eye and right eye viewpoint data to a display driver.

3. The method of claim 2, comprising:
   storing the left eye and right eye viewpoint data in a frame buffer.

4. The method of claim 3, comprising:
   converting the left and right eye viewpoint data in the frame buffer into analog video signals; and
   transmitting the analog video signals to a stereoscopic display device.

5. The method of claim 3, comprising:
   dividing each line in the frame buffer into two regions, a first region for storing left eye data and a second region for storing right eye data.

6. The method of claim 3, comprising:
   dividing the frame buffer into an upper region and a lower region with one of the regions storing left eye data and the other of the two regions storing right eye data.

7. The method of claim 2, wherein the step of generating left eye and right eye viewpoint data comprises:
   receiving rendering requests from the 3D rendering module with 3D objects as arguments; and
   substituting a given target projection plane with two projection planes, based on a viewer model input.

8. The method of claim 7, where the viewer model input is based on the 3D rendering module's representation of 3D object geometry and the representation of the target 2D rendering plane.

9. The method of claim 1, further comprising:
   configuring the filter as a hardware accelerated driver for generating output to a frame buffer.

10. The method of claim 1, comprising:
    transforming 3D content of the 3D graphic object into the plurality of viewpoint data according to a plurality of points of view.

11. A computer system for generating graphics data, comprising:
    a graphics module configured to generate graphics data for a software application executed by the computer system wherein the graphics module is configured to transmit function calls requesting performance of 3D graphics operations;
    a filter configured to receive the function calls and generate a plurality of viewpoint data of a graphical object; and
    a display driver configured to receive the plurality of viewpoint data.

12. The computer system of claim 11, wherein the filter is configured to generate left eye viewpoint data and right eye viewpoint data of the graphical object.

13. The computer system of claim 12, comprising:
    a video controller comprising a frame buffer configured to store the viewpoint data.

14. The computer system of claim 13, comprising:
    an digital-to-analog converter configured to convert the viewpoint data to analog video signals; and
    a stereoscopic display device configured to display the viewpoint data.

15. The computer system of claim 12, wherein the filter is configured to:
    receive rendering requests from the graphics module with 3D objects as arguments; and
    substitute a given target projection plane with two projection planes, based on a viewer model input.

16. The computer system of claim 15, wherein the viewer model input is based on the graphics module's representation of 3D object geometry and the representation of the target 2D rendering plane.

17. The computer system of claim 11, wherein the filter is configured as a hardware accelerated driver and configured to generate output to a frame buffer.

18. The computer system of claim 11, wherein the filter is configured to transform 3D content of the graphical object into the plurality of viewpoint data according to a plurality of points of view.

19. A computer-readable medium having stored thereon a plurality of sequences of instructions, said plurality of sequences of instructions including sequences of instructions which, when executed by a processor, cause said processor to:

receive a function call generated by a 3D rendering module requesting a 3D operation for a graphics object; and generate a plurality of viewpoint data for the graphics object.

20. The computer-readable medium of claim 19, wherein said plurality of sequences of instructions cause said processor to:

generate left eye viewpoint data and right eye viewpoint data; and transmit the left eye and right eye viewpoint data to a display driver.

21. The computer-readable medium of claim 20, wherein said plurality of sequences of instructions cause said processor to:

store the left eye and right eye viewpoint data in a frame buffer.

22. The computer-readable medium of claim 21, wherein said plurality of sequences of instructions cause said processor to:

receive a rendering request from the 3D rendering module with a 3D object as an argument; and substitute a given target projection plane with two projection planes, based on a viewer model input.

23. The computer-readable medium of claim 22, wherein the viewer model input is based on the 3D rendering module's representation of 3D object geometry and the 3D rendering module's representation of the target 2D rendering plane.

24. The computer-readable medium of claim 19, wherein said plurality of sequences of instructions cause said processor to:

generate output to a frame buffer.

25. The computer-readable medium of claim 24, wherein said plurality of sequences of instructions cause said processor to:

divide each line in the frame buffer into two regions, a first region for storing left eye data and a second region for storing right eye data.

26. The computer-readable medium of claim 24, wherein said plurality of sequences of instructions cause said processor to:

divide the frame buffer into an upper region and a lower region, wherein one of the two regions is configured to store left eye data and the other of the two regions is configured to storing right eye data.

27. The computer-readable medium of claim 19, wherein said plurality of sequences of instructions cause said processor to:

transform 3D content of the graphics object into the plurality of viewpoint data according to a plurality of points of view.

28. The computer-readable medium of claim 27, wherein the plurality of viewpoint data comprise:

a plurality of stereoscopic images or a plurality of monocular images corresponding to the plurality of points of view, respectively.

* * * * *